UNITED STATES PATENT OFFICE.

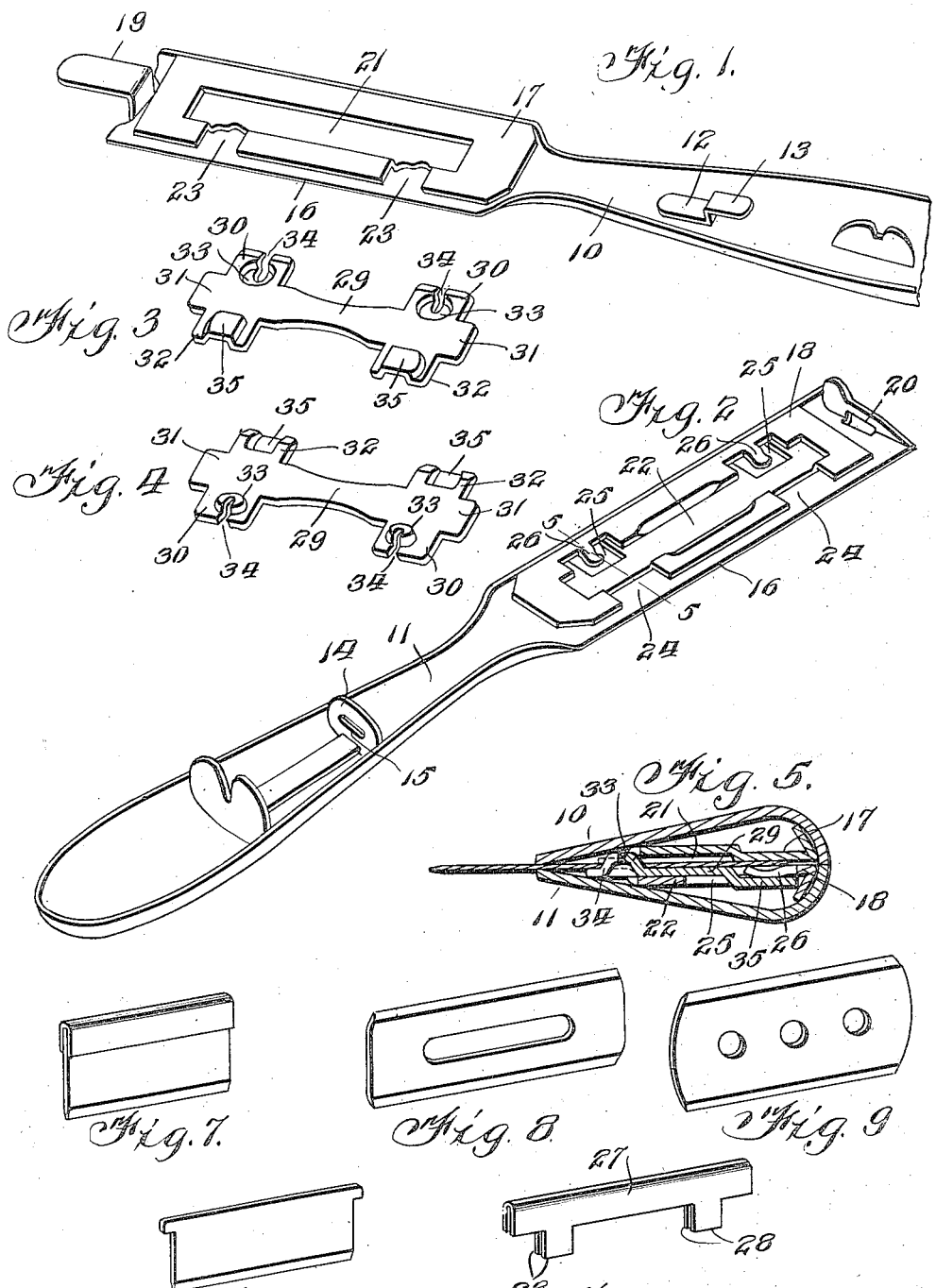

EDWARD JAMES, OF NEW YORK, N. Y.

HOLDER FOR SAFETY-RAZOR BLADES.

1,064,652.      Specification of Letters Patent.      Patented June 10, 1913.

Application filed May 21, 1912. Serial No. 698,811.

*To all whom it may concern:*

Be it known that I, EDWARD JAMES, a citizen of the United States, residing at New York, in the county of New York and State of New York, have invented certain new and useful Improvements in Holders for Safety-Razor Blades; and I do hereby declare the following to be a full, clear, and exact description of the invention, such as will enable others skilled in the art to which it appertains to make and use the same.

My invention relates to safety razor blade holders and has for an object to provide a device embodying the necessary arrangement of parts as to receive blades of various makes and styles.

A further object of this invention is a provision of a reversible member which when fitted within the holder permits the gripping of different type blades.

Further objects will be apparent from the following specification, appended claims and drawings, in which, Figure 1 is a perspective view of one of the halves of the holder, Fig. 2 is a perspective view of the other half of the holder, Fig. 3 is a perspective view of a removable member adapted to be carried by the half of the holder shown in Fig. 2 of the drawings when so desired, Fig. 4 is a perspective view of the member shown in Fig. 3 from the opposite side, Fig. 5 is a sectional view through the holder with the halves assembled as on the line 5—5 of Fig. 2, Fig. 6 is a perspective view of a clamp to be used in connection with certain style blades, Fig. 7 is a perspective view of a blade which may be clamped in the holder without any additional clamping members, Fig. 8 is a perspective view of a blade capable of being sharpened when the insertible member is secured within the holder shown in Fig. 2 of the drawing in the position shown in Fig. 3, Fig. 9 is a perspective view of a blade capable of being gripped in the holder when in the position shown in Fig. 4, and Fig. 10 is a perspective view of a blade to be used in connection with the clamping member shown in Fig. 6.

In inventions of this type, it is necessary that in a single holder razor blades of various types may be held securely therein while stropping the blades and as it is impossible to hold the several types of blades in the same holder without slight modifications of clamping members interchangeable with the holders, it is necessary to accomplish the adjustments with the least number of parts.

My invention comprises a holder formed of the halves 10 and 11 which have handle portions formed thereon which when the halves are assembled form a convenient gripping means for a holder. The half 10 carries a sliding member 12 in the handle portion thereof which sliding member has a tongue 13 extending therefrom which tongue is adapted to engage a spacing member 14 formed in the handle of the half 11 by passing through the aperture 15 formed in said spacing member. The halves 10 and 11 are formed into a body portion 16 in which blade seats 17 and 18 are secured, the end of the body portion 16 and the half 10 of the holder terminates in a tongue 19 which is adapted to pass through a recess 20 formed in the extreme end of the body portion 16 of the half 11 as in assembling the two halves the tongue 19 passes through the opening 20 and the half 10 is swung over the half 11 until the tongue 13 of the sliding member 12 is permitted to engage the spacing member 14 in the handle 11 when the sliding member 12 is slid in the proper direction so as to clamp the two parts together.

Each of the blade seats 17 and 18 is depressed as shown in the drawings by the Figs. 21 and 22 respectively. The blade seat 17 is notched as at 23 for reasons to be hereinafter described. The blade seat 18 is recessed along one edge thereof as at 24 and it is further provided with the openings 25 to be hereinafter described and extending from one edge of the openings are the tongues 26 which are bent downwardly from the plane of the bed plate 18.

When it is desired to sharpen a blade of the type shown in Fig. 7 or Fig. 10 after having been secured in the clamping member as shown in Fig. 6, the enlarged back is placed within the recess 22 of the member 11 after which the member 10 is placed thereon which securely clamps the blade in place and as shown in Fig. 6 of the drawings, the clamping member comprises a false back 27 having resilient extensions 28 therefrom which extensions bear in the recesses 23 and 24 when the several parts are assembled.

When it is desired to sharpen blades of the type shown in Figs. 8 and 9, the reversible and insertible member as shown in Figs. 3 and 4 of the drawings is used. This member comprises a stamped blank 29 having the shank portion which may be reduced as shown in the drawing from the ends of which extend the lugs 30, 31 and 32. The lugs 30 are depressed so as to form the bosses 33 which receive the perforations formed in the blade of the type shown in Fig. 9 of the drawing and the extensions 30 are slotted as at 34 so that when the member 29 is placed within the recess 22 in one position the springs 26 pass through the recess 34 and engage the inside of the cup portion 33. The lugs 32 are depressed so as to form bosses 35 which receive the ends of the slot formed in the blade of the type shown in Fig. 8 of the drawings and as the ends of the slot of such a blade are farther apart than the perforations in the blade shown in Fig. 9 of the drawings, the construction shown in the drawing is necessary to prevent longitudinal movement of the blade.

The member 29 may be placed within the recess 22 so that the inside of the bosses 35 or the bosses 33 may receive the springs 26 so as to expose either the bosses 33 or 35 as the case may be, to receive blades of either of the types shown in Figs. 8 or 9.

The holders for the blade seat portions may be made in various shapes so that they may be inserted in any of the stropping machines now on the market to facilitate in holding safety razor blades for such machines without departing from the spirit of my invention.

I am aware that various modifications may be made within the scope of my invention and I do not restrict myself to the identical form shown in the drawings and having thus described my invention, I claim:

1. A holder for razor blades comprising handle members, blade seats formed therein, said blade seats being formed to accommodate the backs of certain styles of blades, an insertible and reversible member having a shank portion of the size of a depression in one of the seat members, said insertible member having lugs extending from the shank portion thereof, bosses formed on said lugs, said blade seats being recessed to receive said lugs and bosses, and means for fastening said insertible member in one of said blade seats.

2. A holder for safety razor blades in combination with handle members, an insertible and reversible member having sets of bosses formed thereon, each of said sets being spaced differently from the other.

3. In a safety razor blade holder comprising handle members, blade seats secured therein, said blade seats recessed to accommodate various styles of blades and an insertible and reversible member capable of being placed within the recess portion of one of the blade seats, bosses struck from said insertible and reversible member from opposite faces thereof, the bosses of one face accommodating one style blade while the bosses of the opposite face accommodate another style blade, openings formed in the blade seat of one of the members and springs extending from said bed plate member into the opening formed in said bed member and said springs engaging the inside of the bosses formed on said insertible member so as to secure the same securely in place.

4. In a holder for safety razor blades in combination with handles having blade seats formed therein, said blade seats being recessed, to receive backs formed on blades of various styles, an insertible and reversible member comprising a shank having enlargements extending from the ends thereof, enlargements from the sides of said shank having bosses formed thereon, the bosses formed on the enlargements to one side having the ends thereof spaced farther apart than the bosses formed on the opposite side, the enlargements to the side having the bosses thereon closer together being recessed and springs carried by one of the bed plate members adapted to engage the inside of the bosses formed on said insertible member to one side or the other as the case may be when the insertible member is placed in the recess of one of the blade seats.

5. A holder for safety razor blades in combination with handle members, an insertible and reversible member having lugs formed thereon, bosses formed on said lugs, said bosses being arranged in sets, the distance between the bosses of one set being different from that between the other, each of said sets of bosses being intended to receive a safety razor blade and each of said sets of bosses being arranged to receive a fastening means.

6. A holder for safety razor blades comprising an insertible and reversible member comprising a shank having lugs extending from the opposite sides adjacent the ends thereof, bosses formed on said lugs, said bosses being arranged in sets so that one set of bosses is spaced farther apart than the other, each of said sets of bosses being intended to receive razor blades and each of said sets being capable of receiving a fastening means.

In testimony whereof I affix my signature in presence of two witnesses.

EDWARD JAMES.

Witnesses:
GEORGE L. THOM,
HUGO MOCK.